US007850306B2

(12) United States Patent
Uusitalo et al.

(10) Patent No.: US 7,850,306 B2
(45) Date of Patent: Dec. 14, 2010

(54) VISUAL COGNITION AWARE DISPLAY AND VISUAL DATA TRANSMISSION ARCHITECTURE

(75) Inventors: Mikko A. Uusitalo, Helsinki (FI); Markku A. Oksanen, Helsinki (FI); Toni J. Jarvenpaa, Toijala (FI); Viljakaisa Aaltonen, Tampere (FI)

(73) Assignee: Nokia Corporation, Espoo (FI)

( * ) Notice: Subject to any disclaimer, the term of this patent is extended or adjusted under 35 U.S.C. 154(b) by 75 days.

(21) Appl. No.: 12/231,227

(22) Filed: Aug. 28, 2008

(65) Prior Publication Data

US 2010/0056274 A1  Mar. 4, 2010

(51) Int. Cl.
*A61B 3/14* (2006.01)
*A61B 3/00* (2006.01)
*A61B 3/08* (2006.01)

(52) U.S. Cl. .................. 351/209; 351/202; 351/246
(58) Field of Classification Search .......... 351/200–246
See application file for complete search history.

(56) References Cited

U.S. PATENT DOCUMENTS

| 4,513,317 | A |  | 4/1985 | Ruoff, Jr. ............... 358/133 |
| 5,649,061 | A | * | 7/1997 | Smyth ..................... 706/16 |
| 6,580,529 | B1 |  | 6/2003 | Amitai et al. ............. 359/13 |
| 7,306,337 | B2 | * | 12/2007 | Ji et al. ................... 351/209 |
| 7,549,743 | B2 | * | 6/2009 | Huxlin et al. ............. 351/203 |
| 7,556,377 | B2 | * | 7/2009 | Beymer .................. 351/210 |
| 2001/0043163 | A1 |  | 11/2001 | Waldern et al. ............. 345/7 |
| 2003/0184561 | A1 |  | 10/2003 | Vorst ..................... 345/619 |
| 2008/0002262 | A1 |  | 1/2008 | Chirieleison ............. 359/630 |

FOREIGN PATENT DOCUMENTS

EP   0 886 802 B1   11/2001

EP   1 205 882 A2   5/2002

(Continued)

OTHER PUBLICATIONS

"Cortical Magnification within Human Primary Visual Cortex Correlates with Acuity Thresholds", Robert O. Duncan et al., Neuron, vol. 38, May 22, 2003, pp. 659-671.

*Primary Examiner*—Mohammed Hasan
(74) *Attorney, Agent, or Firm*—Harrington & Smith

(57) ABSTRACT

Methods, apparatus and computer program products reduce bandwidth requirements in mobile video and gaming applications by tracking a gaze fixation point of a user on a video image at a remote location; generating information identifying the gaze fixation point at the remote location; transmitting the gaze fixation point information to a source of video information over a network; determining a portion of a video image to transmit at a high resolution and a remaining portion to transmit at a low resolution using the transmitted gaze fixation point information; and transmitting the portion of the video image selected for transmission at a high resolution at the high resolution and the portion of the video image selected for transmission at a low resolution at the low resolution. Further methods, apparatus and computer program product also reduce bandwidth requirements by receiving gaze fixation point information from a remote location, wherein the gaze fixation point information indicates where in a video image a user is currently looking; selecting a portion of video images to transmit at a high resolution and a portion of video images to transmit at a low resolution using the transmitted gaze fixation point information; and transmitting the portions of the video images at the determined resolutions.

44 Claims, 8 Drawing Sheets

FOREIGN PATENT DOCUMENTS

| | | |
|---|---|---|
| EP | 1 301 021 A2 | 4/2003 |
| EP | 1 055 201 A1 | 7/2003 |
| EP | 1 374 597 A2 | 1/2004 |
| EP | 1 397 794 A2 | 3/2004 |
| WO | WO-97/35223 | 9/1997 |
| WO | WO-99/41706 | 8/1999 |
| WO | WO-00/79759 A1 | 12/2000 |
| WO | WO-2005/001547 A1 | 1/2005 |
| WO | WO-2005/011284 A1 | 2/2005 |
| WO | WO-2005/043917 A1 | 5/2005 |
| WO | WO-2005/057248 A2 | 6/2005 |
| WO | WO-2007/085682 A1 | 8/2007 |

* cited by examiner

VISUAL COGNITION AWARE DISPLAY AND VISUAL DATA TRANSMISSION ARCHITECTURE

TECHNICAL FIELD

The exemplary and non-limiting embodiments of this invention relate generally to display methods, systems, devices and computer program products and, more specifically, relate to display methods, systems, devices and computer program products that selectively alter aspects (such as, for example, resolution and color) of displayed information in dependence on where the user is looking.

BACKGROUND

As mobile phones and other hand-held devices incorporate increasingly more powerful processors, it has become possible to add previously impractical applications to these devices, like streaming video and graphic-intensive games. Users, when presented with these options, take advantage of them. In situations where the video information is delivered from a remote source over a network, this may result in a significant increase in network bandwidth utilization. Since network bandwidth typically is not a free resource, the increased utilization of network bandwidth by, for example, video information may have negative consequences. These consequences may be, for example, decreased quality of other services supported by a network, if the increased bandwidth utilization overwhelms network resources; and the need to augment the physical infrastructure of a network to accommodate the increased bandwidth utilization.

Even if the video is sourced from the mobile or hand-held devices themselves (e.g., from a resident graphic-intensive game) the graphics demands presented by such applications may significantly degrade the ability of these devices to multitask. Heretofore, true multitasking capability has been the province of much larger devices like notebook and desktop computers. Mobile and other hand-held devices have typically used RISC-class ("Reduced Instruction Set Computer"—a typical architecture selected for microprocessors incorporated in mobile devices) processors that have a significantly decreased multitasking capability when compared to desktop-class processors. Only at the present time have fabrication advances resulted in the ability to manufacture practical multi-core devices for incorporation in hand-held or mobile devices. Notwithstanding that such mobile multi-core processors are becoming available, these devices remain battery-powered and, as such, have a limited supply of power for supporting multi-tasking. Accordingly, those skilled in the art seek ways to provide high-quality video with simultaneous multitasking ability in such a way so that current battery performance is sufficient to provide acceptable time durations between recharging.

One of the reasons that video is perceived as a processing- and power-hungry application is that it has been felt necessary up until recently to provide full resolution video across the full extent of a display device. Full-resolution video has been perceived as necessary because those skilled in the art until recently did not appreciate the properties of human vision. For example, when a human views an image, typically only a small portion of the image is viewed at high resolution. Areas around a so-called "gaze fixation point" (a part of an image or video that a user is focused on) are seen with decreasing sharpness in dependence on their respective distance from the gaze fixation point. In addition, as a human moves his or her "gaze fixation point" sufficiently quickly to constitute saccadic eye movement from one portion of an image or video to another portion of an image or video, the sharpness of vision falls off markedly and the user is effectively blind for a short period of time. This is in contrast to smooth eye movement where significant visual acuity may be maintained. Accordingly, when it is known that the display environment is directed to a single user, it is only necessary to show an image with a high degree of resolution in an area coincident with a user's gaze fixation point. Reproducing the image in areas around the periphery and beyond of the gaze fixation point is effectively wasteful, since as long as the user is not looking directly at these regions the extra resolution (any resolution above the limited resolution of human peripheral vision) is not used. In addition, updating imagery while a viewer is manifesting quick (saccadic) eye movement is wasteful since during such periods of eye movement changes in image content will not be appreciated by a viewer.

In a multi-viewer environment like television where multiple viewers may be watching, and where each of the viewers may be looking at different portions of the video, this selective-resolution feature of human vision may be used to reduce bandwidth requirements, but with more difficulty. For example in such a situation, one viewer may be looking directly at a region of an image or video that is in the peripheral field of view of another viewer. Thus, if the portion of an image or video that coincided with the peripheral field of view of another was produced at a significantly lower resolution (a resolution below that of the effective resolution of human vision at the gaze fixation point) then a viewer whose gaze fixation point coincided with the reduced-resolution region would find this mode of reproduction totally unacceptable. Therefore one would need to have as many areas of high resolution as there are viewers. However, in many cases viewers would be looking at the same area of the screen.

Some progress has been made in incorporating these facts about human vision in practical systems. However, those skilled in the art seek further improvements. In particular, those skilled in the art seek improvements that can be incorporated in distributed systems.

SUMMARY

An aspect of the exemplary embodiments of the invention is a method, comprising: tracking a gaze fixation point of a user on dynamic imagery; generating gaze fixation point information identifying a current gaze fixation point of the user; and transmitting the gaze fixation point information to a source of dynamic imagery.

In one variant of this aspect of the exemplary embodiments of the invention, the source of dynamic imagery is a remote source accessed over a network. In another variant of this aspect of the exemplary embodiments of the invention, the source of dynamic imagery may be a local source that is integrated in a device containing at least a portion of apparatus performing gaze tracking operations, or the source may be contained in a separate but still local device that is accessed over a wired or wireless short-range network.

In a another variant of this aspect of the exemplary embodiments of the invention, tracking gaze fixation point information further comprises tracking gaze fixation points for multiple users; generating gaze fixation point information identifying a current gaze fixation point of a user further comprises generating gaze fixation point information for each of the multiple users; and transmitting the gaze fixation point information to a source of dynamic imagery further comprises transmitting the gaze fixation point information generated for each of the users to the source of dynamic imagery.

Another aspect of the exemplary embodiments of the invention is a method, comprising: receiving gaze fixation point information identifying where in dynamic imagery a user is currently looking; using the gaze fixation point information to selectively modify dynamic imagery next to be transmitted to the user; and transmitting the dynamic imagery to the user as modified using the gaze fixation point information.

In one variant of this aspect of the exemplary embodiments of the invention, the gaze fixation point information is received at a remote source of dynamic imagery accessed over the internet. In another variant of this aspect of the exemplary embodiments of the invention, the gaze fixation point information is received at a local source of dynamic imagery. The local source of dynamic imagery may be a local source that is integrated in a device containing at least a portion of the apparatus performing gaze tracking operations, or a source that is contained in a separate but still local device that is accessed over a wired or wireless short-range network.

In another variant of this aspect of the exemplary embodiments of the invention, receiving gaze fixation point information further comprises receiving gaze fixation point information from multiple users; and for each of the multiple users, using the gaze fixation point information received from a particular user to selectively modify dynamic imagery next to be transmitted to that user; and transmitting the dynamic imagery to the particular user as modified using the gaze fixation point information received from that user.

In a further variant of this aspect of the exemplary embodiments of the invention, an example modification may be selectively altering the resolution of portions of each image comprising the dynamic imagery in dependence on the respective distances of the portions from the gaze fixation point. In another variant an example modification may be reduction in color content in portions of each image comprising the dynamic imagery that are determined to be in the peripheral vision of a viewer using the gaze fixation point information.

A further aspect of the exemplary embodiments of the invention is an apparatus comprising: an eye tracker configured to track a gaze fixation point of an eye on dynamic imagery, the eye tracker further configured to generate gaze fixation point information identifying a current gaze fixation point of a user; and communications apparatus configured to transmit the gaze fixation point information to a source of dynamic imagery.

In one variant of this aspect of the exemplary embodiments of the invention, the source of dynamic imagery is a remote source accessed over a network. In another variant of this aspect of the exemplary embodiments of the invention, the source of dynamic imagery may be a local source that is integrated with the gaze tracking apparatus, or the source may be contained in a separate but still local device that is accessed over a wired or wireless short-range network.

Yet another aspect of the exemplary embodiments of the invention is an apparatus comprising: communications apparatus configured to receive gaze fixation point information, wherein the gaze fixation point information indicates where in dynamic imagery a user is currently looking; image modification apparatus configured to receive the gaze fixation point information from the communication apparatus and to use the gaze fixation point information to selectively modify dynamic imagery next to be transmitted to the user; and wherein the communications apparatus is further configured to transmit the dynamic imagery as modified using the gaze fixation point information.

In one variant of this aspect of the exemplary embodiments of the invention, the apparatus is positioned at a remote location and receives the gaze fixation point information over the internet. In another variant of this aspect of the exemplary embodiments of the invention, the apparatus is local to the source of gaze fixation point information. The apparatus may be integrated in a device containing at least a portion of the apparatus performing gaze tracking operations, or may be contained in a separate but still local device that is accessed over a wired or wireless short-range network.

In another variant of this aspect of the exemplary embodiments of the invention, the apparatus is configured to receive gaze fixation point information from multiple users; and for each of the multiple users, to use the gaze fixation point information received from a particular user to selectively modify dynamic imagery next to be transmitted to that user; and to transmit the dynamic imagery to the particular user as modified using the gaze fixation point information received from that user.

In a further variant of this aspect of the exemplary embodiments of the invention, the image modification apparatus further may be configured to selectively modify the resolution of portions of each image comprising the dynamic imagery in dependence on the respective distances of the portions from the gaze fixation point. In another variant, the image modification apparatus further may be configured to reduce color content in portions of each image comprising the dynamic imagery that are determined to be in the peripheral vision of a viewer using the gaze fixation point information.

A still further aspect of the exemplary embodiments of the invention is a computer program product comprising a computer readable memory medium tangibly embodying a computer program, wherein when executed by digital processing apparatus the computer program is configured to control an apparatus to track a gaze fixation point of a user on dynamic imagery; to generate gaze fixation point information identifying a current gaze fixation point of a user; and to control communications apparatus to transmit the gaze fixation point information to a source of dynamic imagery over a network.

Another aspect of the exemplary embodiments of the invention is a computer program product comprising a computer readable memory medium tangibly embodying a computer program, wherein when executed by digital processing apparatus the computer program is configured to control an apparatus to receive gaze fixation point information from a remote location, wherein the gaze fixation point information indicates where in dynamic imagery a user is currently looking; to selectively alter dynamic imagery next to be transmitted to user a using the gaze fixation point information; and to control communications apparatus to transmit the dynamic imagery as modified using the gaze fixation point information.

In one variant of this aspect of the exemplary embodiments of the invention, an example modification implemented by the computer program when executed may be selectively altering the resolution of portions of each image comprising the dynamic imagery in dependence on the respective distances of the portions from the gaze fixation point. In another variant an example modification may be reduction in color content in portions of each image comprising the dynamic imagery that are determined to be in the peripheral vision of a viewer using the gaze fixation point information.

In conclusion, the foregoing summary of the various embodiments of the present invention is exemplary and non-limiting. For example, one of ordinary skill in the art will understand that one or more aspects or steps from one embodiment can be combined with one or more aspects or steps from another embodiment to create a new embodiment within the scope of the present invention.

DETAILED DESCRIPTION

Figure 1:
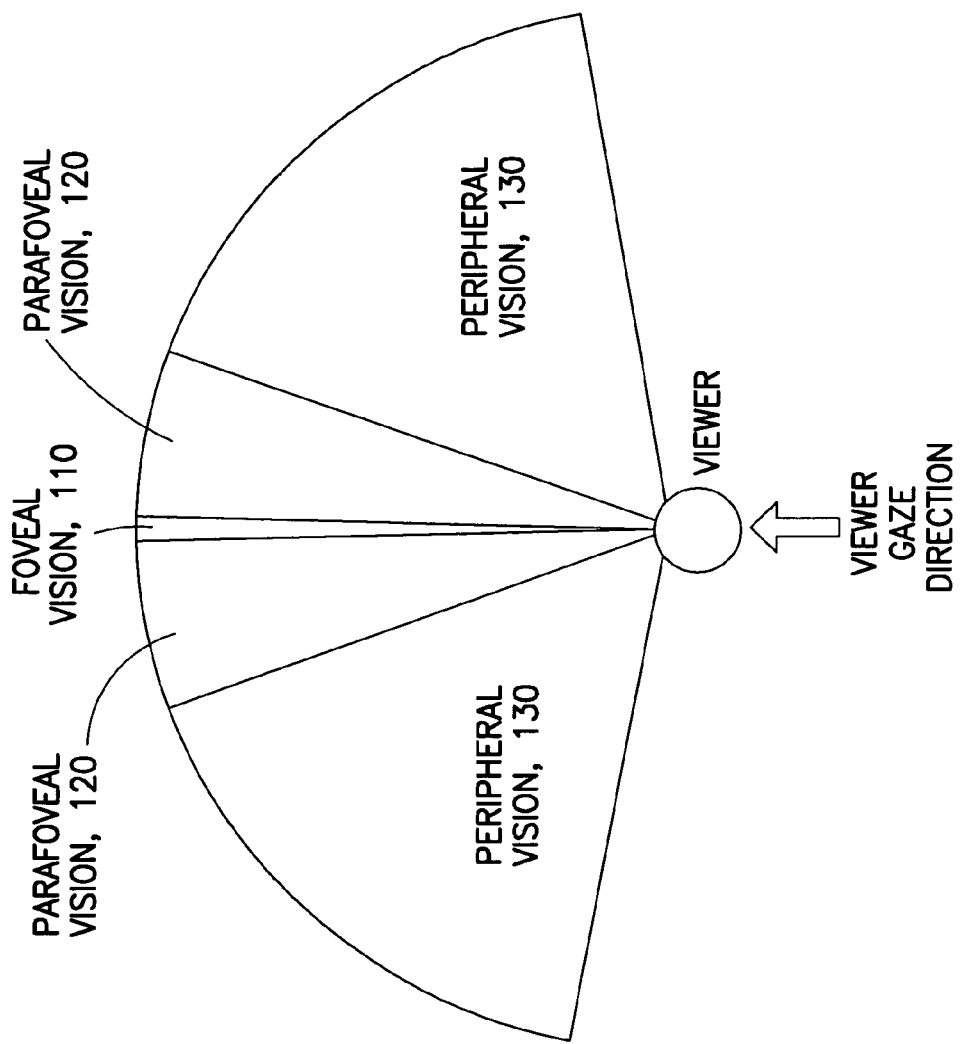
FIG. 1 is a diagram depicting characteristics of human vision relevant to aspects of the invention.

FIG. 1 depicts in conceptual terms characteristics of human vision that are relevant to this invention. Foveal 110, para-foveal 120 and peripheral vision 130 work together to produce visual perception, but each has distinct characteristics.

The fovea is the central area of the retina, also called the macula, extending about a few degrees out from the center of the eye. When a human is "looking at" something, the human is directing his or her eyes so that the image is projected onto the fovea. This central area is filled with cone photoreceptors. Foveal vision uses this area of the retina, and the response to radiation is described by the photopic sensitivity function.

Para-foveal 120 describes the region surrounding the fovea, corresponding to the retinal area from two to ten degrees off-center. The response of the combined foveal and para-foveal regions to radiation is described by a variant of the photopic sensitivity function known as the CIE Supplementary Observer. This region of the retina has a mix of photoreceptors, with all three types of cones and rods present.

Peripheral vision 130 refers to the region of the retina outside the central ten degree area. The periphery of the retina has a low density of cones of all three types, but is dominated by rods. The highest density of rods is between 10 and 30 degrees out, peaking at 20 degrees. Peripheral vision is a part of vision that occurs outside the very center of gaze. There is a broad set of non-central points in the field of view that is included in the notion of peripheral vision. "Far peripheral" vision exists at the edges of the field of view, "mid-peripheral" vision exists in the middle of the field of view, and "near-peripheral", also referred to as "parafoveal" vision, exists adjacent to the center of gaze.

Peripheral vision is weaker in humans, compared with other animals, especially at distinguishing and sensing shape. This is because the density of receptor cells on the retina is greatest at the center and lowest at the edges. In addition, there are two types of receptor cells, rod cells and cone cells; rod cells are unable to distinguish color and are predominant at the periphery, while cone cells are concentrated mostly in the center of the retina (the macula).

Flicker fusion threshold is higher for peripheral than foveal vision. Peripheral vision is good at detecting motion (a feature of rod cells), and is relatively strong at night or in the dark, when the lack of color cues and lighting makes cone cells far less useful. This makes it useful for avoiding predators, who tend to hunt at night and may attack unexpectedly.

The invention takes advantage of these characteristics of human vision to reduce bandwidth requirements when dynamic imagery (for example video) is transmitted over a network. In the invention a measurement system determines what area a human viewer is momentarily looking at. This location is called the "gaze fixation point". A data processing algorithm uses the gaze fixation point information and only displays and renders information at high resolution that coincides with foveal vision and renders portions that will be perceived by peripheral vision at a much lower resolution. As long as the eye is not detected as moving, the analysis takes place for every frame to be displayed. If the eye is moving (saccadic movement), no update in the picture information is needed, because the moving eye is almost blind (saccadic suppression) and would not notice that the picture is not fine tuned according to the new position of the eye. This has the beneficial property in that the unwanted color breakup effect in field-sequential color displays is reduced, leading to more clearly perceived image and no disturbing extra colors in such displays.

In embodiments of the invention, a transmission protocol or rendering algorithm uses gaze fixation point information in a predictive manner to only transmit or render parts of the next image at high detail level when it is needed. This reduces needed data transmission speed, bandwidth, radio power and rendering power requirements. Without this kind of a system connecting a high-resolution display wirelessly to an image source is not viable because of the high requirement of the bandwidth. In mobile gaming, large power savings are realizable if high resolution rendering is not needed for all parts of every displayed frame. Current PC level gaming experience is not possible to reach in mobile devices due to very high power consumption of rendering electronics.

The system needs a source of images, a system to transmit, decompress or calculate the images, the display receiving the images to be shown, a device detecting the point at which the user is looking at, and a feedback loop from the eye tracking device to the source of images.

Large eye movements called saccades are made typically 2-3 times a second. A system operating in accordance with the invention is configured to be sufficiently fast in order to be able to track the gaze direction and provide the gaze point to the computing unit's rendering engine without an observable delay. After a saccadic eye movement the saccadic suppression still limits the perceived image and a system with overall speed of 50-100 frames per second (fps) should be satisfactory. Second main type of eye movement is smooth tracking, which is not limiting the system speed as the gaze point does not have to be in the exact center of the area of high resolution.

The system can consist of a direct-view display and either a Near-to-Eye Gaze Tracker (NEGT) or a Remote Eye Gaze Tracker (REGT), or a virtual display and NEGT.

Very large displays can be fed over a lower data rate link if irrelevant information is not transmitted at all. This naturally requires low latency in the decision-making of what to transmit, below 10 ms in an exemplary embodiment. Personal displays such as head-mounted video glasses would require much less processing power particularly when it comes to rendering game scenery for a single player. This would be extremely beneficial for mobile gaming where the terminal rendering power will always be behind what is available in the PC world.

To illustrate the benefit, consider a display that covers 18 degrees in vertical and 24 degrees in horizontal visual space, and has 1024 times 768 pixels. Such size covered in visual space corresponds to a 40 inch display at a distance of two meters. In such a case, the data size of the picture could be reduced by over 70% from 790 kilopixels to about 220 kilopixels, by taking into account the reduced resolution at a distance from the point of fixation.

Figure 2:
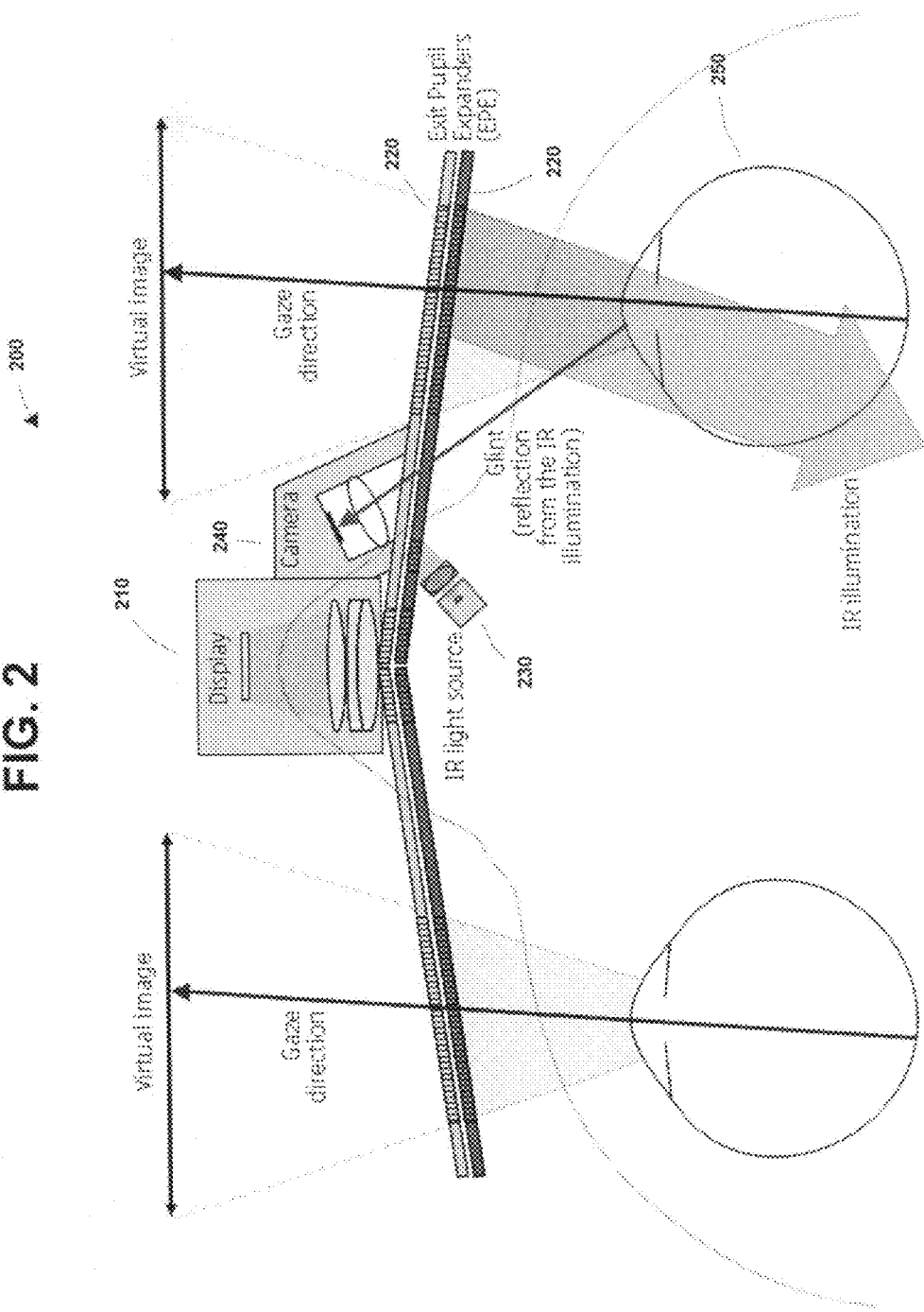
FIG. 2 is a schematic diagram of an eye sensor operating in accordance with the invention.

FIG. 2 depicts an exemplary eye tracker configured in accordance with the invention, incorporated in an apparatus that also includes a display. The apparatus 200 includes a display 210 for displaying dynamic imagery using exit pupil expanders 220 that position the image generated by the display in the field of view of the user. An infra-red (IR) light source 230 generates light to be used to detect eye movement. The IR light impinges an exit pupil expander 220 and is shone on the viewer's eye 250. A camera 240 then detects the reflections of the infra-red light as well as the eye pupil contour. Changes in the positions of the detected infra-red light reflections and the pupil contour are used to detect movement of the viewer's eye.

Figure 3:
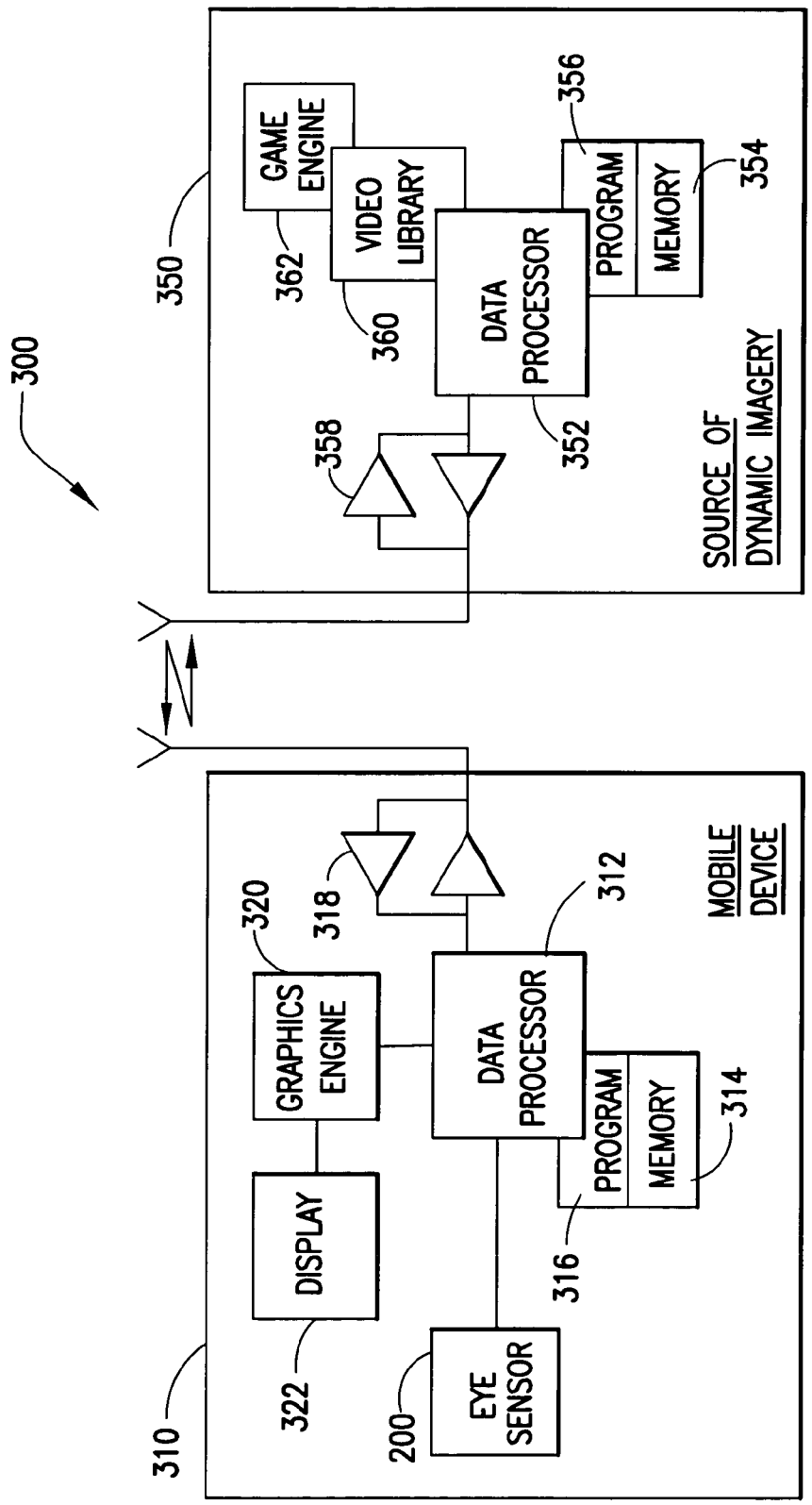
FIG. 3 is a block diagram depicting a system comprised of elements practicing aspects of the invention.

FIG. 3 depicts a system 300 in which aspects of the invention may be practiced. In FIG. 3 a wireless network 300 is adapted for communication between at least one mobile device 310 and a remote source of dynamic imagery 350. The mobile device 310 includes a data processor 312, a memory 314 that stores a program 316, and a suitable radio frequency (RF) transceiver 318 for bidirectional wireless communications with the remote source of dynamic imagery 350. The remote source of dynamic imagery 350 also includes a data processor 352, a memory 354 that stores a program 356, and a suitable RF transceiver 358.

Also shown in FIG. 3 associated with mobile device 310 is an eye tracker 200 like that depicted in FIG. 2, a graphics engine 320 and a display 322. Also associated with the remote source of dynamic imagery 350 are a video library 360 and a gaming engine 362. Both the video library 360 and the gaming engine 362 may generate dynamic imagery acted upon by embodiments of the invention.

For the embodiment shown in FIG. 3 at least the programs 316 and 356 are assumed to include program instructions that, when executed by the respective associated data processors 312 and 352, enable the electronic devices to operate in accordance with the exemplary embodiments of this invention, as will be discussed below in greater detail.

In general, the various embodiments of the mobile device 310 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The exemplary embodiments of this invention may be implemented by computer software executable by the data processor 312, or by hardware, or by a combination of software and hardware.

As depicted in FIG. 3, the mobile device 310 and remote source of dynamic imagery 350 are depicted as communicating over a wireless connection. Alternatively, the mobile device 310 and remote source of dynamic imagery 350 may communicate over a wired link like the internet, or over a combination wired/wireless link. In further embodiments, the source of dynamic imagery may not be remote but may be local. In such embodiments, the source of dynamic imagery may be accessed over a local wired or wireless link, or may be at least partially incorporated in a device containing the eye sensor 200 and playback apparatus 320, 322.

The memories 314 and 354 may be of any type suitable to the local technical environment and may be implemented using any suitable data storage technology, such as semiconductor-based memory devices, magnetic memory devices and systems, optical memory devices and systems, fixed memory and removable memory. The data processors 312 and 352 may be of any type suitable to the local technical environment, and may include one or more of general purpose computers, special purpose computers, microprocessors, digital signal processors (DSPs) and processors based on a multi-core processor architecture, as non-limiting examples.

Figure 6:
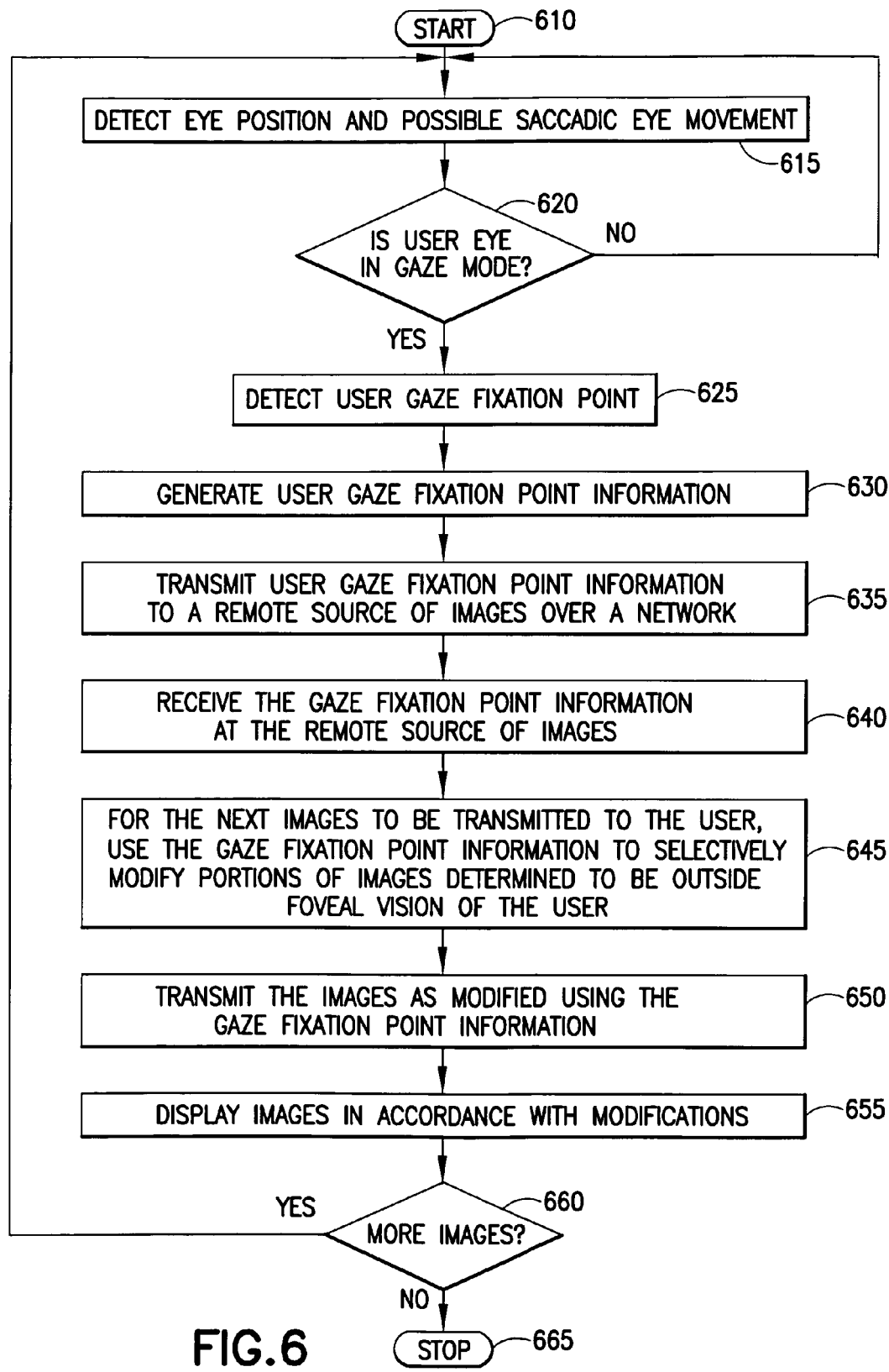
FIG. 6 is a flowchart depicting a method operating in accordance with the invention.
Figure 7:
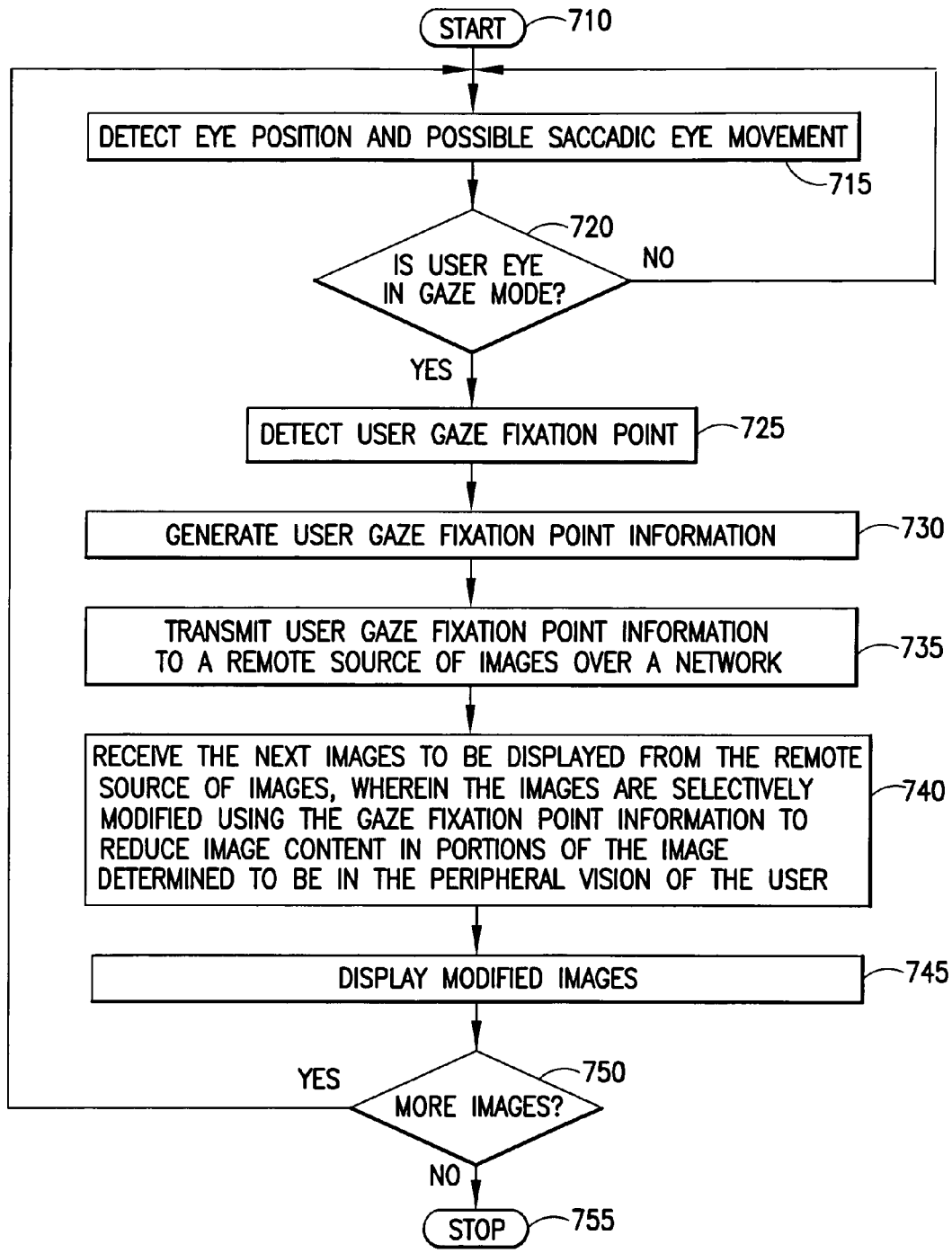
FIG. 7 is a flowchart depicting another method operating in accordance with the invention.
Figure 8:
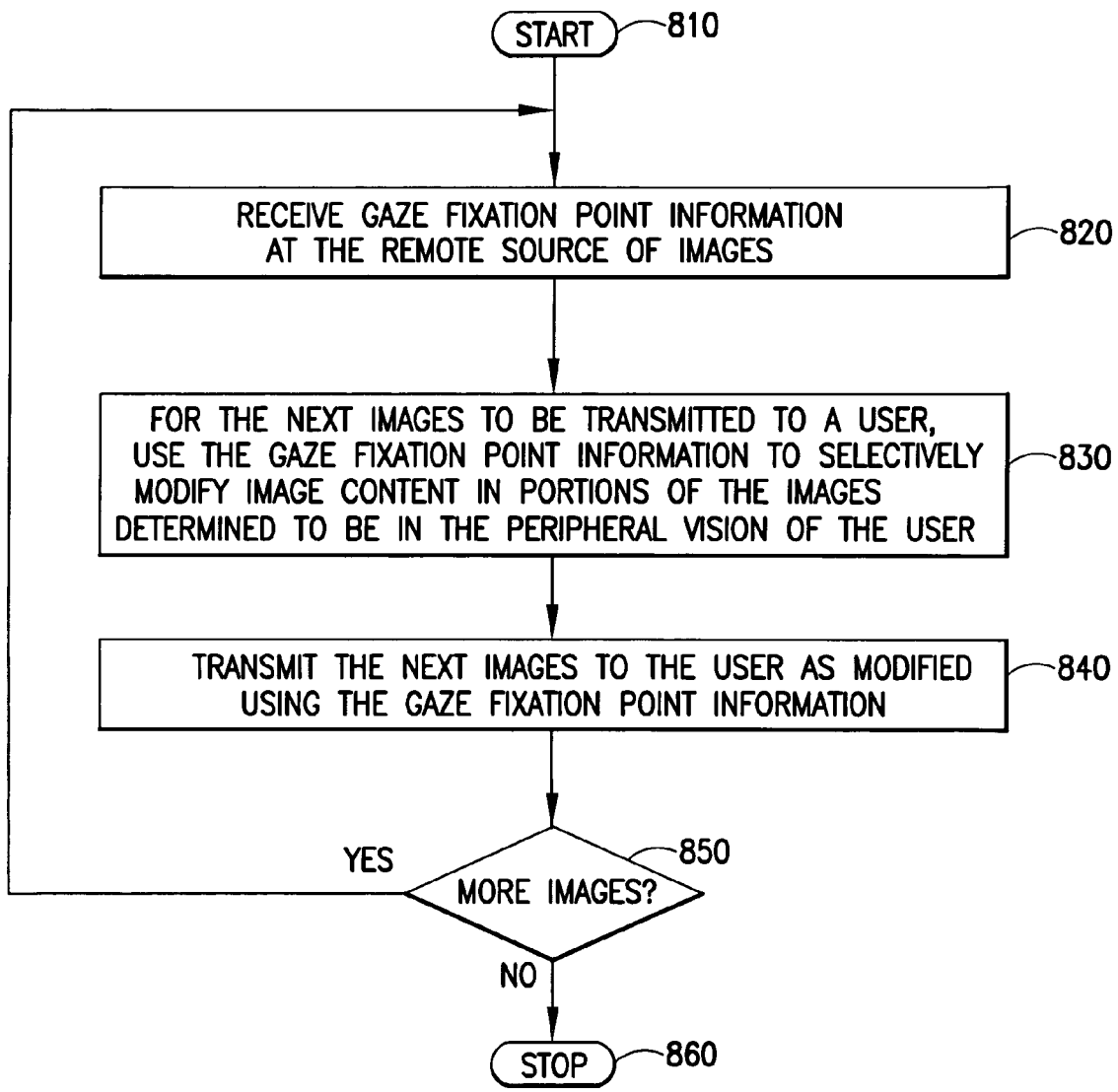
FIG. 8 is a flowchart depicting a further method operating in accordance with the invention.

FIGS. 6-8 are flowcharts summarizing methods operating in accordance with the invention. The method depicted in FIG. 6 summarizes the steps occurring in a system 300 operating in accordance with the invention, both at the mobile device 310 of an end user and at a remote source of images 350. The method starts at 610. Next, at step 615 performed at the mobile device 310 of a user, the mobile device 310 detects eye position. Using the eye position information generated by an eye sensor 200, the mobile device 310 determines whether the eye is exhibiting saccadic movement. At decision diamond 620, it is determined whether the user eyes are in gaze mode (not exhibiting saccadic movement). As explained previously, there is no need to provide updates when a user is changing his gaze fixation point. If the user eyes are moving fast enough (resulting in saccadic suppression), it is determined that the user is not in gaze mode, and the method returns to 615. The method loops through steps 615 and 620 until it is determined that the user is in gaze mode.

Accordingly, at some point, the method will detect that the user eyes are no longer moving fast enough to result in saccadic suppression. The method then proceeds to 625, where the eye sensor 200 of the mobile device 310 detects the user gaze fixation point. Next, at 630, the mobile device 310 generates user gaze fixation point information to be transmitted to a remote source of dynamic imagery (such as, for example, video). Then, at 635, the mobile device 310 transmits the user gaze fixation point information to a remote source of images 350 over a network. Next, at 640, the remote source of images receives the gaze fixation point information. Then, at 645, the remote source of images 350 for the next images to be transmitted to the user uses the gaze fixation point information to selectively modify portions of images determined to be outside of the foveal vision of the user with the gaze fixation point information. Next, at 650, the remote source of images 350 transmits the images to the user in accordance with the modifications made using the gaze fixation point information. Then, at 655, the mobile device 310 receives and displays the images in accordance with the modifications made by the remote source of images 350 using the user gaze fixation point information.

Next, at decision diamond 660 it is determined by the mobile device 310 whether the user is still calling for more images. If so, the method returns to step 615. If not, the method stops at 665.

In a variants of the method depicted in FIG. 6, the source of dynamic imagery may be a local source accessed over a local wired or wireless network. In other variants, the source of dynamic imagery may be at least partially incorporated in a device that also incorporates eye tracking and dynamic imagery playback apparatus.

Figure 4:
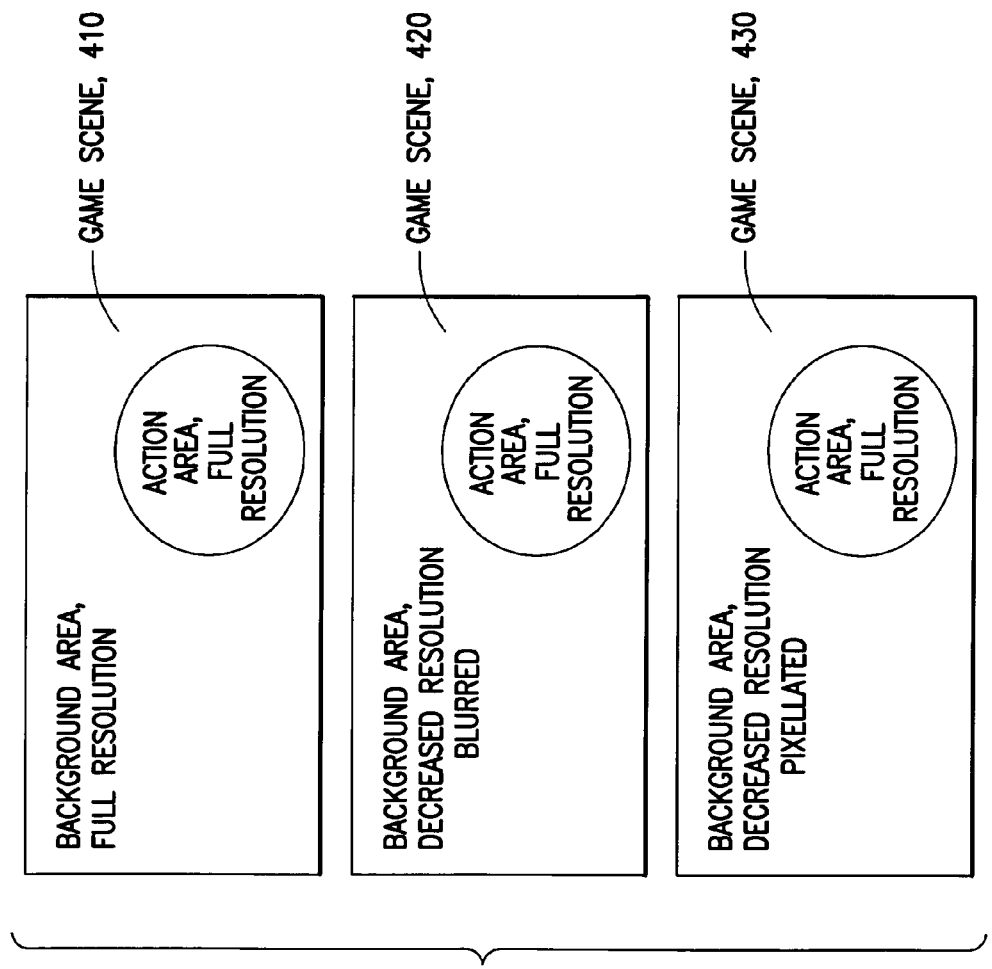
FIG. 4 show examples of how image portions from a game may be depicted, where two example images have reduced-resolution portions that have been modified using gaze fixation point information.

FIG. 4 depicts the operation of the invention in a single-viewer scenario. Game scenes 410, 420 and 430 are schematic representations of individual images from a game. The action area of the game is circled, and it is expected that a user will have his gaze fixed to this portion of the image during game play. Instead of having to render in full resolution an entire scene as in example 410, in embodiments of the invention only a portion of the image coincident with the game action need be depicted in full resolution as shown in examples 420 and 430. The background may be pixellated or blurred.

Figure 5:
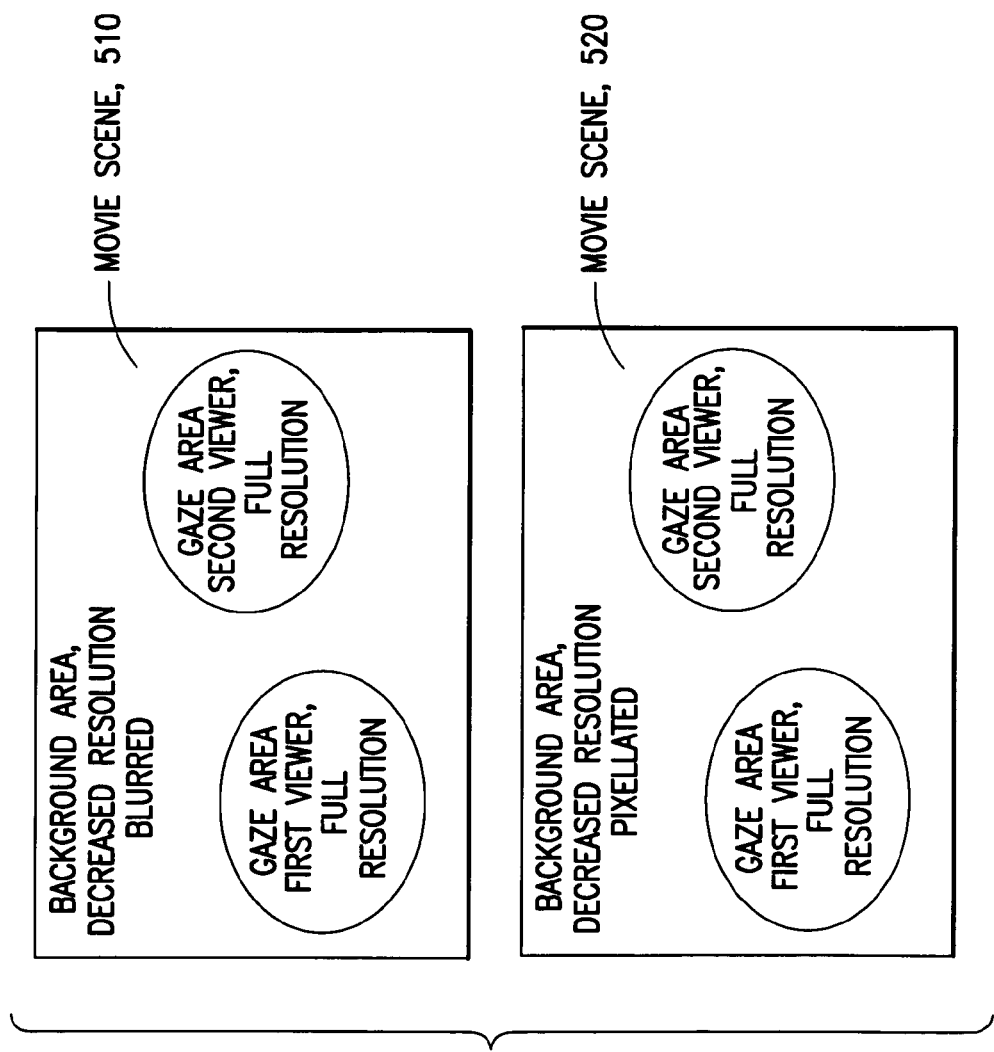
FIG. 5 shows examples of how image portions from a movie may be depicted in a multi-viewer scenario operating in accordance with the invention.

FIG. 5 depicts the effect of the invention in a multi-viewer scenario. In contrast to the game of FIG. 4, a movie is being played in the scenario depicted in FIG. 5. In the multi-viewer scenario of FIG. 5, first and second viewers are gazing at different locations in the movie scene 510 and 520. The portions of the movie scene where the first and second viewers are gazing are reproduced at full resolution, while the remaining portions are reproduced at lower resolution, either blurred or pixellated.

FIG. 7 depicts a method that operates at a mobile device 310. The method starts at 710. Next, at 715, the mobile device 310 detects eye position and possible saccadic eye movement. If the mobile device 310 determines at decision diamond 720 that the user eye is moving (the user is not in gaze mode), the method loops back to 715 to detect eye position and possible eye movement.

At some point, the method will detect that the user eye is no longer moving and conclude that the user is in gaze mode. The method then proceeds to 725, where the eye sensor 200 associated with the mobile device 310 detects the user gaze fixation point. Next, at 730, the mobile device generates user gaze fixation point information to be transmitted to a remote source of dynamic imagery (such as, for example, video). Then, at 735, the mobile device 310 transmits the user gaze fixation point information to the remote source of images over a network 350.

Then, at 740, the mobile device receives the next images to be displayed from the remote source of images, wherein the images are modified to reduce image content using the gaze fixation point information. Next, at 750 the mobile device 310 displays the images in accordance with the modifications made by the remote source of images 350 using the user gaze fixation point information.

Then, the method proceeds to decision diamond 750 to determine if the user is still calling for dynamic imagery. If so, the method proceeds to step 715. If not, the method stops at 755.

In one variant of the method depicted in FIG. 7 generating gaze fixation point information identifying a current gaze fixation point of a user further is performed at a rate greater than a frame rate of the dynamic imagery.

In another variant of the method depicted in FIG. 7 detecting or tracking a gaze fixation point of a user on a dynamic imagery at a remote location further comprises detecting eye movement greater than a pre-determined threshold, and suspending generation of new gaze fixation point information while the eye continues to move at a rate greater than the pre-determined threshold.

In a further variant of the method depicted in FIG. 7 the dynamic imagery further comprises video imagery. In yet another variant of the method depicted in FIG. 7 the dynamic imagery further comprises dynamic imagery generated by a game.

In yet another variant of the method depicted in FIG. 7, transmitting the gaze fixation point information to a source of dynamic imagery over a network further comprises transmitting the gaze fixation point information over a wireless network. In a still further variant of the method depicted in FIG. 7, transmitting the gaze fixation point information to a source of dynamic imagery over a network further comprises transmitting the gaze fixation point information over a wired network.

In another variant of the method depicted in FIG. 7, the gaze fixation point information is used by the source of dynamic imagery to select a portion of each image comprising the dynamic imagery to be transmitted at a high resolution and a portion of each image comprising the dynamic imagery to be transmitted at a low resolution. In such an embodiment, the method further comprises: receiving the portions of each image transmitted respectively at high and low resolutions over a wireless network; and displaying the respective image portions at the selected resolutions.

In a further variant of the method of depicted in FIG. 7, the gaze fixation point information is used by the source of dynamic imagery to select a portion of each image comprising the dynamic imagery to be transmitted at a high resolution and a portion of each image comprising the dynamic imagery to be transmitted at a low resolution. In such an embodiment, the method further comprises: receiving the portions of each image transmitted respectively at high and low resolutions over a wired network; and displaying the respective image portions at the selected resolutions.

FIG. 8 depicts a method performed at a remote source of images 350 in accordance with aspects of the invention. The method starts at 810. Then, at 820, the remote source of images 350 receives gaze fixation point information from a user who is currently viewing dynamic imagery (such as, for example, video) on a mobile device at a remote location. Next, at 830, for the next images to be transmitted to a user, the remote source of images 350 uses the gaze fixation point information to selectively modify the images to reduce image content. Then, at 840, the images are transmitted in accordance with the modifications made using the gaze fixation point information. Next, at 850, the remote source of images 310 determines whether any more images are likely to be requested. If so, the method returns to 820 to receive more gaze fixation point information. If not, the method stops at 860.

In a variant of the method depicted in FIG. 8, the image modification may comprise reducing resolution of portions of images determined to be outside the foveal vision of a user with the gaze fixation point information. This may be performed by gradually reducing the resolution in dependence on the distance of portions from the gaze fixation point. Alternatively a simpler method may be used where background image portions are reduced to a uniform low resolution while an action portion corresponding to the gaze fixation point is left at full resolution. Alternatively, the image modification may comprise reducing color content of image portions determined to be in the peripheral vision of a user with the gaze fixation point information.

In a variant of the method depicted in FIG. 8, receiving from a remote location gaze fixation point information further comprises receiving gaze fixation point information from a plurality of users. In such a variant, selectively modifying the images further comprises selectively modifying images to be transmitted to a particular user using the gaze fixation point information received from that particular user.

In another variant of the method depicted in FIG. 8 the dynamic imagery further comprises video imagery. In a further variant of the method depicted in FIG. 8 the dynamic imagery further comprises dynamic imagery generated by a game.

In yet another variant of the method depicted in FIG. 8, transmitting the portion of each image comprising the dynamic imagery selected for transmission at a high resolution at the high resolution and the remaining portion of each image selected for transmission at a low resolution at the low resolution further comprises transmitting the respective portions over a wireless network.

In a still further variant of the method depicted in FIG. 8, transmitting the portion of each image comprising the dynamic imagery selected for transmission at a high resolution and the remaining portion of each image selected for transmission at a low resolution further comprises transmitting the respective portions over a wired network.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
    tracking a gaze fixation point of a user on dynamic imagery;
    generating gaze fixation point information identifying a current gaze fixation point of the user; and
    transmitting the gaze fixation point information to a source of the dynamic imagery
    where tracking the gaze fixation point of the user on the dynamic imagery occurs at a remote location and wherein transmitting the gaze fixation point information to the source of the dynamic imagery further comprises transmitting the gaze fixation point information to a remote source of the dynamic imagery over a network.

2. The method of claim 1 wherein generating the gaze fixation point information identifying the current gaze fixation point of the user further comprises generating new gaze fixation point information at a rate greater than a frame rate of the dynamic imagery.

3. The method of claim 1 wherein tracking the gaze fixation point of the user on the dynamic imagery further comprises detecting eye movement greater than a pre-determined threshold, and suspending generation of new gaze fixation point information while the eye continues to move at a rate greater than the pre-determined threshold.

4. The method of claim 1 wherein the dynamic imagery further comprises video imagery.

5. The method of claim 1 wherein the dynamic imagery further comprises dynamic imagery generated by a game.

6. The method of claim 1, wherein transmitting the gaze fixation point information to the remote source of the dynamic imagery over the network further comprises transmitting the gaze fixation point information over a wireless network.

7. The method of claim 1, wherein transmitting the gaze fixation point information to the remote source of the dynamic imagery over the network further comprises transmitting the gaze fixation point information over a wired network.

8. The method of claim 1, the gaze fixation point information is used by the remote source of the dynamic imagery to selectively modify images comprising the dynamic imagery, wherein the method further comprises:
    receiving the dynamic imagery as modified using the gaze fixation point information; and
    displaying the modified dynamic imagery.

9. The method of claim 8 wherein the remote source of the dynamic imagery uses the gaze fixation point information to selectively modify resolutions of portions of each image comprising the dynamic imagery.

10. The method of claim 8 wherein the remote source of the dynamic imagery uses the gaze fixation point information to selectively modify color content of portions of each image comprising the dynamic imagery.

11. The method of claim 1, wherein the gaze fixation point information is used by the remote source of dynamic imagery to select a portion of each image comprising the dynamic imagery to be transmitted at a high resolution and a portion of each image comprising the dynamic imagery to be transmitted at a low resolution, wherein the method further comprises:
    receiving the portions of each image transmitted respectively at high and low resolutions over a wireless network; and
    displaying the respective image portions at the selected resolutions.

12. A method comprising:
    receiving from a remote location gaze fixation point information identifying where in dynamic imagery a user is currently looking;
    using the gaze fixation point information to selectively modify dynamic imagery next to be transmitted to the user; and transmitting the dynamic imagery to the user as modified using the gaze fixation point information, wherein the gaze fixation point information is also received from a plurality of users, wherein the gaze fixation point information received from each user is used to determine how to selectively modify the dynamic imagery next to be transmitted to that particular user, wherein the dynamic imagery is transmitted to that particular user as modified using the gaze fixation point information received from that particular user.

13. The method of claim 12 wherein using the gaze fixation point information to selectively modify dynamic imagery next to be transmitted to the user further comprises selectively modifying the resolution of portions of each image comprising the dynamic imagery using the gaze fixation point information.

14. The method of claim 13 where selectively modifying the resolution of portions of each image comprising the dynamic image using the gaze fixation point information further comprises selectively varying the resolution of the portions in dependence on the respective distances of the portions from the gaze fixation point.

15. The method of claim 12 wherein using the gaze fixation point information to selectively modify dynamic imagery next to be transmitted to the user further comprises selectively modifying each image comprising the dynamic imagery to reduce color content in portions of each image that are determined to be in the peripheral vision of a viewer.

16. The method of claim 12 wherein the dynamic imagery further comprises video imagery.

17. The method of claim 12 wherein the dynamic imagery further comprises dynamic imagery generated by a game.

18. The method of claim 12 wherein transmitting the dynamic imagery to the user as modified using the gaze fixation point information further comprises transmitting the modified dynamic imagery over a wireless network.

19. The method of claim 12 wherein transmitting the dynamic imagery to the user as modified using the gaze fixation point information further comprises transmitting the modified dynamic imagery over a wired network.

20. An apparatus comprising:
an eye tracker configured to track a gaze fixation point of an eye on dynamic imagery, the eye tracker further configured to generate gaze fixation point information identifying a current gaze fixation point of a user; and
communications apparatus configured to transmit the gaze fixation point information to a remote source of dynamic imagery, where the communications apparatus is further configured to transmit the dynamic imagery wherein at least a portion of each image comprising the dynamic imagery is transmitted at a high resolution and at least a portion of each image comprising the dynamic imagery is transmitted at a low resolution, and wherein the gaze fixation point information is used to determine what portions of individual images to transmit at high and low resolutions.

21. The apparatus of claim 20 wherein the eye tracker is further configured to generate new gaze fixation point information identifying a current gaze fixation point of a user at a rate greater than a frame rate of the dynamic imagery.

22. The apparatus of claim 20 wherein the eye tracker is further configured to detect eye movement greater than a pre-determined threshold, and to suspend generation of new gaze fixation point information while the eye continues to move at a rate greater than the pre-determined threshold.

23. The apparatus of claim 20 wherein the dynamic imagery further comprises video imagery.

24. The apparatus of claim 20 wherein the dynamic imagery further comprises dynamic imagery generated by a game.

25. The apparatus of claim 20 wherein the communications apparatus further comprises a wireless transceiver configured to transmit the gaze fixation point information to the remote source of dynamic imagery over a wireless network.

26. An apparatus comprising:
communications apparatus configured to receive gaze fixation point information from a remote location, wherein the gaze fixation point information indicates where in dynamic imagery a user is currently looking, and configured to receive the gaze fixation point information from a plurality of users;
image modification apparatus configured to receive the gaze fixation point information from the communication apparatus, to use the gaze fixation point information to selectively modify dynamic imagery next to be transmitted to the user, and to receive gaze fixation point information from each user of the plurality of users to determine how to selectively modify the dynamic imagery next to be transmitted to that particular user; and
wherein the communications apparatus is further configured to transmit the dynamic imagery as modified using the gaze fixation point information and is configured to transmit to that particular user the dynamic imagery as modified using the gaze fixation point information received from that particular user.

27. The apparatus of claim 26 wherein the dynamic imagery further comprises video imagery.

28. The apparatus of claim 26 wherein the dynamic imagery further comprises dynamic imagery generated by a game.

29. The apparatus of claim 26 wherein the communications apparatus further comprises wireless communications apparatus configured to transmit and to receive information over a wireless network.

30. The apparatus of claim 26 wherein the communications apparatus is further configured to transmit and to receive information over a wired network.

31. A non-transitory computer readable storage medium tangibly embodying a computer program, which, when executed by a digital processing apparatus, performs actions as follows: tracking a gaze fixation point of a user on dynamic imagery; generating gaze fixation point information identifying a current gaze fixation point of the user; and controlling an apparatus to transmit the gaze fixation point information to a source of dynamic imagery,
where tracking the gaze fixation point of the user on the dynamic imagery occurs at a remote location and wherein transmitting the gaze fixation point information to the source of the dynamic imagery further comprises transmitting the gaze fixation point information to a remote source of the dynamic imagery over a network.

32. The non-transitory computer readable storage medium of claim 31, further comprising operating the apparatus to generate gaze fixation point information identifying a current gaze fixation point of the user at a rate greater than a frame rate of the dynamic imagery.

33. The non-transitory computer readable storage medium of claim 31, further comprising operating the apparatus to detect eye movement greater than a pre-determined threshold, and to suspend generation of new gaze fixation point information while the eye continues to move at a rate greater than the pre-determined threshold.

34. The non-transitory computer readable storage medium of claim 31, wherein the dynamic imagery further comprises video imagery.

35. The non-transitory computer readable storage medium of claim 31, wherein the dynamic imagery further comprises dynamic imagery generated by a game.

36. The non-transitory computer readable storage medium of claim 31, wherein transmitting the gaze fixation point information to the source of the dynamic imagery over a network further comprises transmitting the gaze fixation point information over a wireless network.

37. The non-transitory computer readable storage medium of claim 31, wherein transmitting the gaze fixation point information to the source of the dynamic imagery over a network further comprises transmitting the gaze fixation point information over a wired network.

38. The non-transitory computer readable storage medium of claim 31, wherein the gaze fixation point information is used by the source of dynamic imagery to select a portion of each image comprising the dynamic imagery to be transmitted at a high resolution and a portion of each image comprising the dynamic imagery to be transmitted at a low resolution, further comprising receiving the portions of each image transmitted at high and low resolutions over a wireless network; and displaying the respective image portions at the selected resolutions.

39. The non-transitory computer readable storage medium of claim 31, wherein the gaze fixation point information is used by the source of the dynamic imagery to select a portion of each image comprising the dynamic imagery to be transmitted at a high resolution and a portion of each image comprising the dynamic imagery to be transmitted at a low resolution, further comprising receiving the portions of each image transmitted respectively at high and low resolutions over a wired network; and displaying the respective image portions at the selected resolutions.

40. A non-transitory computer readable storage medium tangibly embodying a computer program, which, when executed by a digital processing apparatus, performs actions as follows:

receiving from a remote location gaze fixation point information from a remote location identifying where in dynamic imagery a user is currently looking;

selectively modifying dynamic imagery next to be transmitted to the remote location to reduce image content using the gaze fixation point information; and transmitting the dynamic imagery to the user as modified using the gaze fixation point information, wherein the gaze fixation point information is also received from a plurality of users, wherein the gaze fixation point information received from each user is used to determine how to selectively modify the dynamic imagery next to be transmitted to that particular user, wherein the dynamic imagery is transmitted to that particular user as modified using the gaze fixation point information received from that particular user.

41. The non-transitory computer readable storage medium of claim 40, wherein the dynamic imagery further comprises video imagery.

42. The non-transitory computer readable storage medium of claim 40, wherein the dynamic imagery further comprises dynamic imagery generated by a game.

43. The non-transitory computer readable storage medium of claim 40, wherein selectively modifying dynamic imagery further comprises reducing resolution in portions of images comprising the dynamic imagery that are determined to be in the peripheral vision of the user with the gaze fixation point information.

44. The non-transitory computer readable storage medium of claim 40, wherein selectively modifying dynamic imagery further comprises reducing color content in portions of images comprising the dynamic imagery that are determined to be in the peripheral vision of the user with the gaze fixation point information.

\* \* \* \* \*

UNITED STATES PATENT AND TRADEMARK OFFICE
CERTIFICATE OF CORRECTION

PATENT NO. : 7,850,306 B2  
APPLICATION NO. : 12/231227  
DATED : December 14, 2010  
INVENTOR(S) : Uusitalo et al.

Page 1 of 1

It is certified that error appears in the above-identified patent and that said Letters Patent is hereby corrected as shown below:

Claim 8, column 12, line 34, after "claim 1," please insert --wherein--.

Signed and Sealed this  
First Day of February, 2011

David J. Kappos  
*Director of the United States Patent and Trademark Office*